United States Patent [19]

Ito et al.

[11] 4,208,110
[45] Jun. 17, 1980

[54] CAMERA WITH SELECTABLE AUTOMATIC AND MANUAL EXPOSURE CONTROL

[75] Inventors: Fumio Ito, Yokohama; Akio Sunouchi, Tokyo; Mutsuhide Matsuda, Yokohama; Ryoichi Suzuki, Kawasaki; Takashi Uchiyama, Yokohama; Yoshiaki Watanabe, Fujisawa, all of Japan

[73] Assignee: Canon Kabushiki Kaisha, Tokyo, Japan

[21] Appl. No.: 943,356

[22] Filed: Sep. 18, 1978

Related U.S. Application Data

[63] Continuation of Ser. No. 777,931, Mar. 15, 1977.

[30] Foreign Application Priority Data

Mar. 19, 1976 [JP] Japan ................................. 51-30493
Mar. 19, 1976 [JP] Japan ................................. 51-30494

[51] Int. Cl.² ........................ G03B 7/00; G03B 17/38; G03B 17/18
[52] U.S. Cl. ...................................... 354/31; 354/38; 354/60 E; 354/267
[58] Field of Search .................. 354/31, 36, 38, 60 R, 354/234, 235, 267, 268, 266, 256, 258, 60 E, 60 L

[56] References Cited

U.S. PATENT DOCUMENTS 3,922,693  11/1975  Matsui ............................... 354/234 X
4,015,198  3/1977  Iwashita et al. .................... 354/43 X

FOREIGN PATENT DOCUMENTS 2060200  6/1972  Fed. Rep. of Germany ............. 354/31
2236052  2/1973  Fed. Rep. of Germany ........... 354/235

OTHER PUBLICATIONS

*Mamiya/Sekor Auto XTL* (Brochure), marketed by Ponder and Best Inc., 11201 W. Pico Boulevard, Los Angeles, CA 90064.

*Primary Examiner*—L. T. Hix
*Assistant Examiner*—William B. Perkey
*Attorney, Agent, or Firm*—Toren, McGeady and Stanger

[57] ABSTRACT

In the disclosed camera exposure control device, a first control automatically controls the camera exposure on the basis of a signal generated by a first brightness sensor. A second control automatically controls an exposure on the basis of a manual setting that responds to a second brightness sensor. A mode selector enables either an electromagnetic actuator that operates the first exposure control or a mechanical actuator that operates the second control.

12 Claims, 5 Drawing Figures

CAMERA WITH SELECTABLE AUTOMATIC AND MANUAL EXPOSURE CONTROL

This is a continuation of application Ser. No. 777,931 filed Mar. 15, 1977.

BACKGROUND OF THE INVENTION

1. Field of the Invention

The present invention relates to a camera switchable automatic between and manual exposure control.

2. Description of the Prior Art

In conventional TTL light measuring systems, the brightness of an object is measured by responding to light coming from the object through the camera's objective lens. These systems fall into one of three types, namely an average light measuring system which measures the average intensity of the light passing through the lens, a weighted measuring system which responds mainly to the brightness in the center of the beam from the subject, and a partial light measuring system that measures the brightness only of an important selected portion of the subject.

Each light measuring system has its own advantages and disadvantages. No one can be considered the best. However, various kinds of TTL automatic exposure (AE) control cameras are manufactured. In such cameras, partial photometric systems are not convenient when photographs are taken rapidly. Thus, TTL-AE cameras often use average light measuring or average photometric systems. Such cameras frequently include automatic shutter or aperture controls as well as manual controls and permit free selection of these controls.

In conventional TTL-AE cameras, the exposure is controlled on the basis of the average light measurement even when the camera is operating in the manual mode. However, a photographer may not desire this type of light measuring system in the manual mode.

Moreover, these types of cameras are unable to measure the brightness even when the exposure is mechanically controlled when the voltage of the power source decreases. This makes correct exposure difficult. Normally, the photographer must estimate the needed exposure.

The purpose of the present invention is to eliminate the shortcomings of conventional TTL-AE cameras.

Another purpose of the present invention is to offer an exposure control device so designated that the light measuring circuit is operable with a low voltage even when the circuit does not operate due to the deterioration of the power source apt to take place in the electrically controlled camera in such a manner that all other circuits than the light measuring circuit can be changed over into the mechanical controls.

Further other purposes of the present invention will be disclosed from the explanations to be made below in accordance with embodiments of the present invention.

DESCRIPTION OF THE PREFERRED EMBODIMENT

Figure 1:
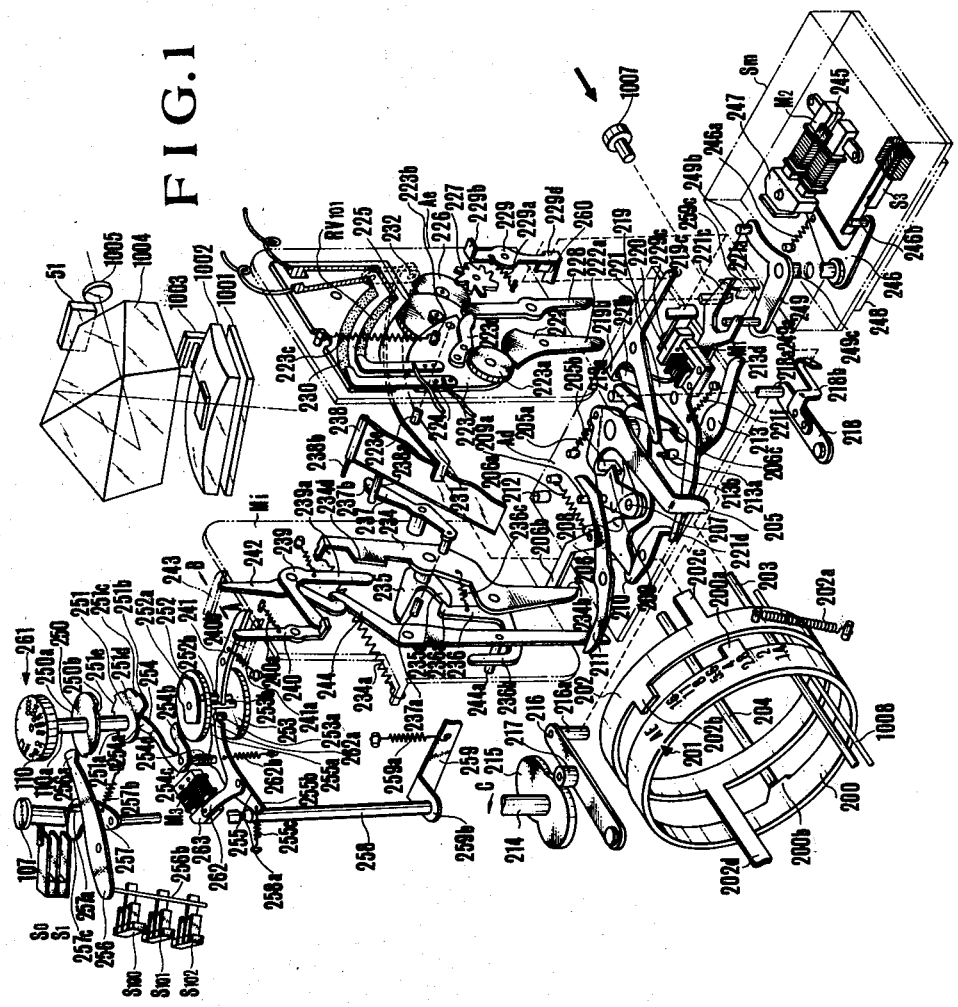
FIG. 1 shows an embodiment of the exposure control device for a camera in accordance with the present invention.

FIG. 1 shows the camera with the film wound and the shutter energized. An aperture ring 200 is provided with an automatic aperture AE index and a manual aperture index as well as a projection 200a and a cam member 200b. An index 201 serves for making the automatic aperture AE index coincide with the manual aperture index. An aperture preset ring 202 is urged clockwise by a spring 202a and includes a projection 202b engageable with the projection 200a of the aforementioned aperture ring 200.

The aperture preset ring 202 is provided an arm 202c, and serves to determine the rotation of the bell crank through a not shown aperture set cam ring by means of a lever 202d which it carries bell. crank serves to control the rotation of the aperture (not shown) so as to determine the opening of the aperture. The ends of a pin 203 on the aforementioned aperture driving ring is engaged with the automatic aperture lever 205 and urged counter-clockwise by the spring 205a of the automatic aperture unit Ad. This automatic aperture lever 205 presents a includes in a protruding part 205b. An auto-manual change over signal pin 204 responds to the operation for making the AE index of the afore mentioned aperture ring 200 coincide with the manual aperture index 201.

An automatic aperture energy storing lever 206 is coaxially pivoted on the lever 205. The automatic aperture energy storing lever 206 is urged clockwise by the spring 206a, while the shaft 207 in the middle of one side of the lever 206 is pivoted by the spring 208 on the common lever 209. The end of the common lever 209 engages the depending part 205b of the afore mentioned automatic aperture lever 205. The automatic aperture energy storing lever 206 is also engaged with the holding claw 210 for tensioning the spring 206a. An automatic aperture return signal lever 211 has one end is engaging a pin 209a of the afore mentioned common lever 209. A stopper pin 212 serves for controlling the rotation range of the automatic aperture energy storing lever 206. A charge lever 213 charges the spring 206a of the afore mentioned automatic aperture energy storing lever 206, and stepped part 213a of the pin at the middle of the charge lever 213 engages member 206c of the automatic aperture energy storing lever 206.

In order to energize the charge lever 213 during the winding operation, a charge cam 215 on the shaft 214 functionally engages an unillustrated winding up lever in such a manner that the motion of the cam 215 is transmitted to the intermediate lever 218 through the roller 217, the charge transmission lever 216, the pin 216a on the lever 216 and the unillustrated connecting member. The pin 218a provided on this intermediary lever 218 engages the afore mentioned charge lever 213. The middle of the intermediary lever 218 carries a magnet charge plate 218b consisting of elastic material. A three forked lever serving as the charge member for letting the automatic exposure control magnet $M_1$ attract the armature 220 has one end 219a engaged with the stepped part 213b of the charge lever 213 while another end 219b is held by the hook part 221b of the release lever 221, and another end 219c engages member 229d of a stop wheel claw 229 to be explained.

A three tined release lever 221 is urged counter clockwise by spring 221f, and one end 221d is engageable with the holding claw 210. The automatic exposure control unit Ae possesses a charge gear 222 to be engaged with the afore mentioned charge. A sector gear 223 carries a gear 223a to be engaged with the charge gear 222, the resistance slide 224 and the Ae holding lever 223d. The sector gear 223 is engaged with the speed adjusting (accelerating) gears 225 and 226 and the stop wheel 227. Further, the sector gear 223 is urged counter clockwise by the spring 223c. The spring 223c is weaker than the spring 202a at the side of the lens.

A holding lever 228 is held at one end of the holding plate 223d of the sector gear 223, while the other end is engaged with the part 221c of the afore mentioned release lever 221. A stop wheel claw 229 is urged counter clockwise by the spring 229a, one end having a claw part 229b for the preventing rotation of the stop wheel 227 while the other end adds the afore mentioned armature 220 which is pivoted by the shaft 229c. A variable resistance 230 for series automatic exposure control. A signal lever 231 has one end engaged to the arm 202c of the afore mentioned aperture preset ring 202 and a middle portion is pivoted with the pin 223e provided on the sector gear 223 while the other end is pivoted on the support lever 232.

A mirror lift mechanism unit Mi possesses a mirror driving lever 234 to engage the end 206b of the automatic aperture energy storing lever 206. A lever 234 is urged counter clockwise by the spring 234a. Coaxially pivoted on the mirror driving lever 234 is a mirror lift up lever 235 which engages a hook 236a of the lift up holding claw 236 pivoted on the mirror driving lever 234. Further the lift up holding claw 236 is urged along the clockwise direction by means of the spring 236c. The mirror lift up lever 235 is engaged with the pin 237a provided at the one end of the lift up intermediary lever 237, whose other end 237b is engaged with the pin 238a provided on the mirror receiving plate 238. (238b is the rotary shaft of the mirror receiving plate 238). Further, the afore mentioned mirror driving lever 234 present the projection 234d to be engaged with the end 239a of a front shutter plane (or leading shutter curtain) holding lever 239 whose other end is held at the bent part of a shutter plane (or curtain) release lever 240. The upper end of the lever 240 engages a front shutter plane (or ending shutter curtain) keeping lever 241 for starting the front shutter plane (or leading shutter curtain) of the shutter mechanism, not shown. A set lever engages a winding mechanism, not shown, so as to charge the spring 240a.

A rear shutter plane signal lever (or trailing shutter curtain signal lever) 242 pivots independently about the same axis as the holding lever 239 and engages a signal lever 243 that is operated by the termination signal of the trailing shutter curtain of the shutter mechanism.

The other end of the lever 242 engages the upper end of a mirror return signal lever 244. A pin 244a at the middle of the lever 244 engages the bent portions 236b of the claw 236. The lower end of the lever 244 engages the end of the automatic aperture return signal lever 211 in the portion Ad.

A magnet $M_2$ in the camera release unit Sm includes a permanent magnet 245. An armature holding lever 246 in the unit Sm holds the armature 247. A spring 246a urges the lever 246 counterclockwise. The spring 246a is stronger than the spring 221f of the lever 221 but weaker than the permanent magnet 245. A pin 246b at one end of the armature holding lever 246 is engageable with a memory switch $S_3$. Forming a part of the release unit Sm is a frame body of a non-magnetic material for casing the members of the unit, such as the magnet $M_2$, the lever 246, the switch $S_3$, etc. A member 248 serves as a magnetic shield. The entire camera release unit Sm is within a casing. A shaft 249a connects the lever 246 with a start signal lever 249 in order to transmit the signal of the lever 246. The pin 249a on the start signal lever 249 engages with the member 221a of the lever 221. A pin 249a at the other end of the lever 249 is engageable with the magnet charge plate 218b of the intermediate lever 218. A shutter dial 110 is provided with a shutter time scale 110A for the electrical control and a scale 110B for the mechanical control. The dial 110 moves relative to an index 261 for setting the shutter time. The shutter dial 110 turns on electrical-mechanical selector over cam 250 and a mechanical shutter time setting cam 251 by means of a shaft 110a. The cam 250 includes an electrical control portion 250a and the mechanical control portion 250b. The 251 includes an electrical control part 251a and the cam parts 251b, 251c, 251d and 251e established the mechanical control of the shutter time.

A leading or front shutter gear 251 has fixed thereon a cam 252a and a front shutter plane holding pin 252b. A rear shutter plane (or trailing shutter curtain) has a rear shutter plane holding pin 253a and the charge pin 253b thereon fixed. An explanation of the conventional winding up gear, the shutter pinion gear and so on functionally engaged with the leading shutter curtain gear 252 and the trailing shutter curtain gear 253 is omitted. A shutter button when pressed, closes switches $S_0$ and $S_1$.

256 is the electrical-mechanical change over lever, whose one end 256a is in contact with the above mentioned change over cam 250 while the switches $S_{100}$, $S_{101}$ and $S_{102}$ are changed over by means of the pin 256b provided on the other end. 257 is the driven lever urged along the clockwise direction by means of the spring 257b, presenting the pin 257a in contact with the afore mentioned change over lever 256, whereby the lever 257 is movable downwards, the one end 257c being pushed by means of the above mentioned shutter button 107. 258 is the release bar being fixed on the above mentioned driven lever 257 and presenting the groove 258a in the middle, whereby the end of the release bar 258 is fixed at the bent part 259b of the discharge lever 259. The discharge lever is urged along the clockwise direction by means of the spring 259a, whereby the bent end 259c is engaged with the folk part 221c of the above mentioned release lever 221. 254 is the time control lever, whose end 254a is in contact with the mechanical time setting cam 251 and whose other end 254b is engageable with the cam 252a. The time control lever 254 is provided on the second rear shutter plane holding lever 255 through the shaft 254c, whereby the end 254a of the lever 254 is normally in contact with the mechanical time setting cam by means of the spring 254d. The second rear shutter plane holding lever 255 is urged along the clockwise direction by means of the spring 255c, whereby the one end 255 holds the pin 253a on the rear shutter plane gear 253 while the other end 255b is in contact with the release bar 258. 261 is the first rear shutter holding lever on whose one end the armature 263 of the magnet $M_3$ is mounted and whose other end 262c holds the pin 253a on the rear shutter plane gear 253.

Figure 3:
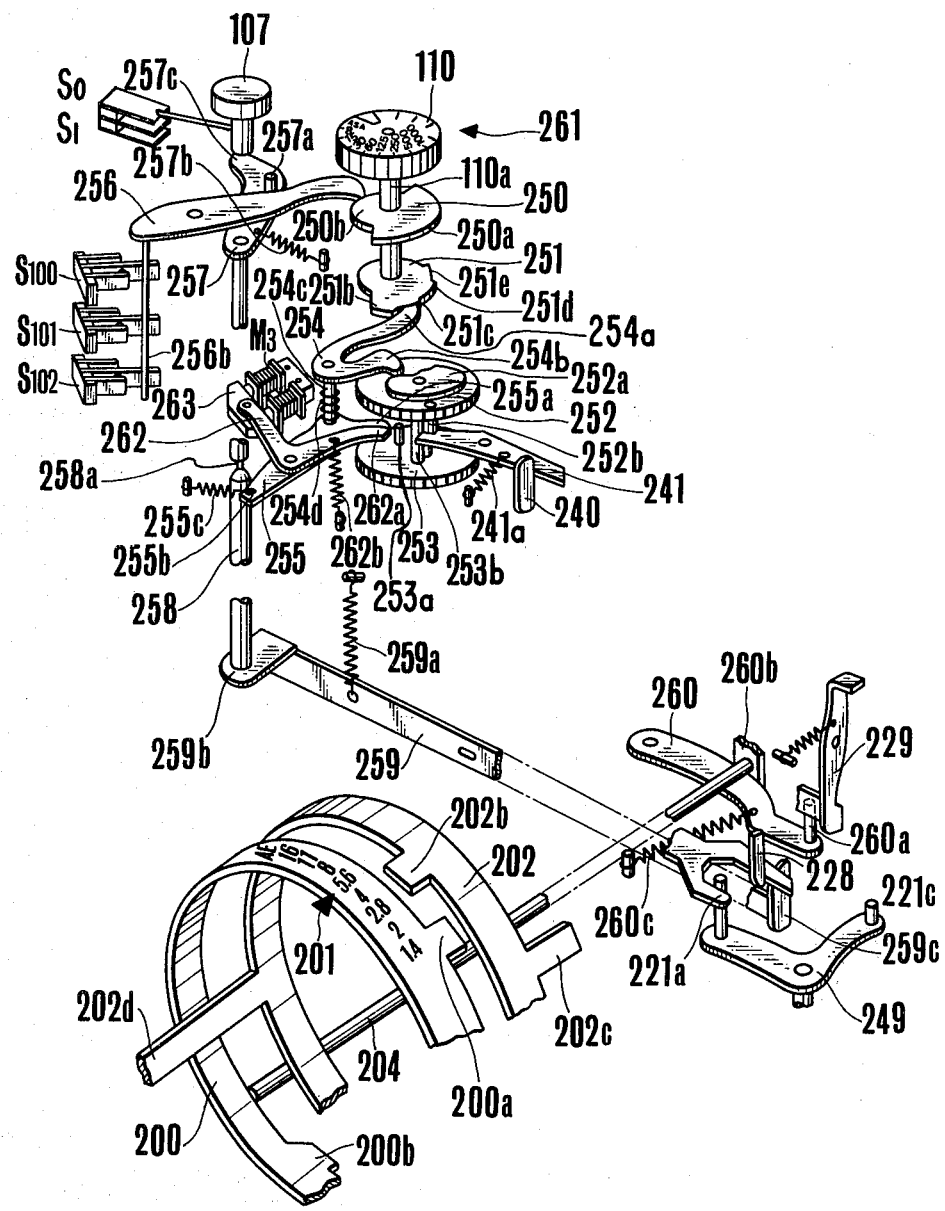
FIG. 3 shows the important members of the camera shown in FIG. 1.

A first rear shutter plane holding lever 262 is pivoted coaxially with the second rear shutter plane holding lever 255 so as to push the armature 263 against the magnet $M_3$ by means of the spring 262b. Member 260 (see FIG. 3) is a holding lever, whose protrusion 260a is in contact with the auto-manual change over signal pin 204 and on whose one end the pin 260a is fixed. The holding lever 260 is set so that the part 260b is normally set in contact with the auto-manual change over signal pin 204 by means of the spring 260c.

Figure 2:
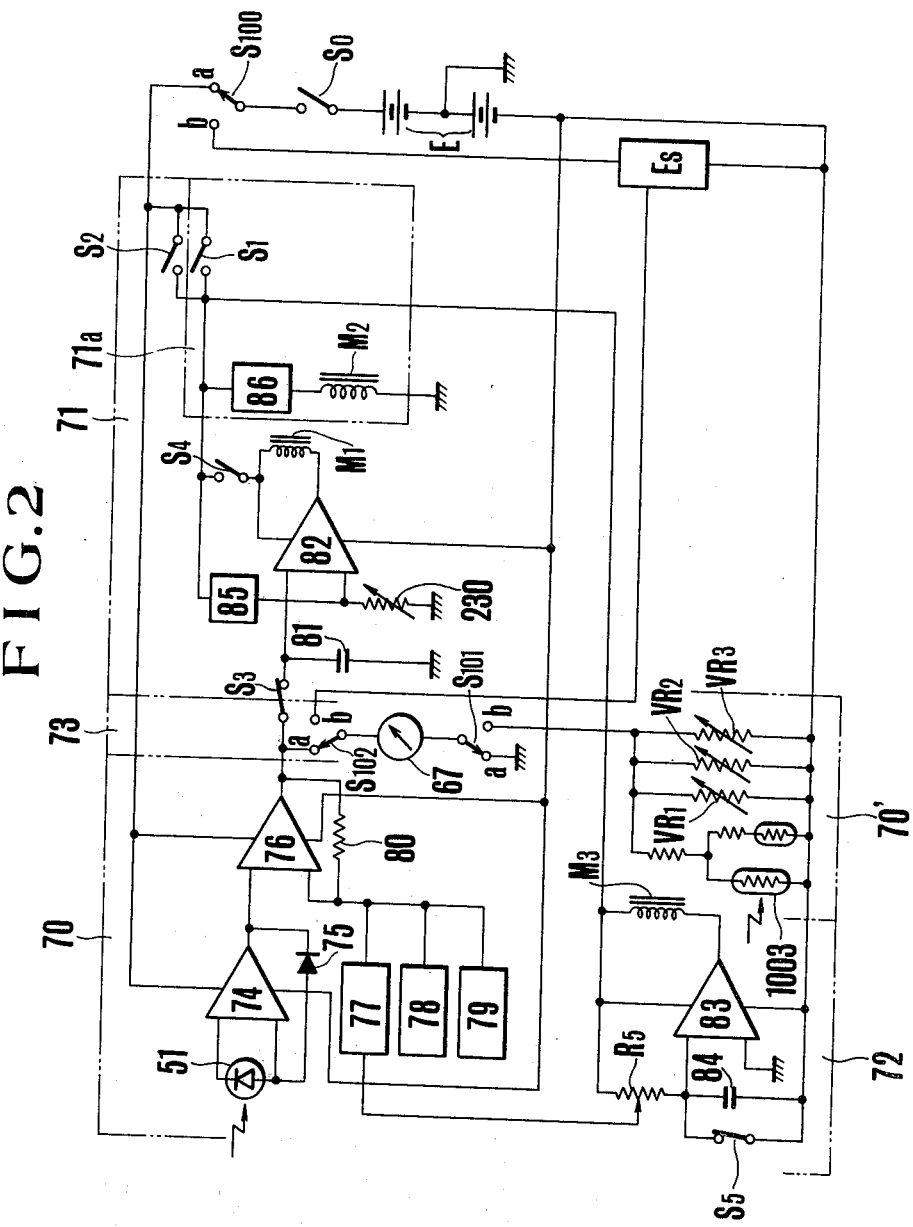
FIG. 2 shows the exposure control circuit for the camera shown in FIG. 1.

FIG. 2 shows the exposure control circuit of the camera in FIG. 1, with the same members as those in FIG. 1 having like reference characters. The element E is the power source, to which an average light measuring circuit 70, a partial light measuring circuit 70', a release circuit 71a, an aperture control circuit 71, and an electronic shutter control circuit 72 are connected. An aperture display car unit 73 is connected between the afore mentioned light measuring circuit 70 and the afore mentioned aperture control circuit 71. Switch $S_{100}$ is a auto-manual change over switch to be connected to the terminal a during the auto operation. During manual operation, the manual light measuring circuit 70' is in operation and, the current supply to the constant voltage circuit Es is carried out through the terminal b.

In the release circuit 71a, a delay circuit 86 is connected in series with the switch $S_1$ and the release magnet $M_2$. The delay circuit 86 serves to delay the excitation time of the release magnet $M_2$ so as to release the shutter after the magnet $M_2$ has been excited. If the delay time is produced by means of the mechanical operation, the delay circuit can be omitted. In the light measuring circuit 70, 74 is the amplifier connected to the afore mentioned power source E. A light sensing element 51 is connected between the first input terminal and the second input terminal of an amplifier 74 and a logarithmic compression diode 75 is connected between the output terminal and the second input terminal of the amplifier 74. The output signal of the amplifier 74 is applied to the first input terminal of the operator 76 for APEX operation. The second input terminal of this operator 76 receives the shutter time setting signal from the shutter time setting circuit 77, the film sensitivity setting signal from the film sensitivity setting circuit 78 and the exposure compensation information signal from the exposure compensation information circuit 79.

A resistance 80 is connected between the second input terminal and the output terminal of the operator 76. The ouput signal of the operator 76 is applied to the meter 67 as the aperture display circuit 73. Further, the output signal of the operator 76 is delivered to the aperture control circuit 71, and applied to the condenser 81 and the first input terminal of the comparator 82 through the switch $S_3$. This comparator 82 is connected to the power source E through the switch $S_1$ consisting of the manual switch $S_4$ to be closed and opened in functional engagement of the above mentioned pin 203 and the hold switch $S_2$ to be closed and opened by means of the above mentioned automatic aperture lever 205 connected in parallel with $S_4$, the afore mentioned auto-manual change over switch $S_{100}$ and the power source switch $S_0$ in series. The second input terminal of the comparator 82 is connected to the connecting point of the constant current circuit 85 and the variable resistance 230. The output signal of the comparator 82 serves to control the excitation of the magnet $M_1$. In the electronic shutter control circuit 72, 83 is the Schmidt circuit connected to the power source E and $R_5$ the variable resistance whose value varies in accordance with the shutter time setting signal from the shutter time setting circuit 77. The variable resistance $R_5$ constitutes the time constant circuit, connected in series with the condensor 82 connected in parallel with the start switch $S_5$. The connecting point of the variable resistance $R_5$ and the condensor 84 is connected to the first input terminal of the Schmidt circuit 83, whose second input terminal is grounded. The output signal of the Schmidt circuit controls the shutter control magnet $M_3$.

In the view finder part F, member 1001 is the focusing plate while 1002 is the condenser lens, on a part of 1002 a half-permeable mirror 1002' is provided slantly toward the optical axis in such a manner that the light of a part of the image is led to the light sensing element CdS 1003 place on one side of 1002, so as to carry out the partial light measurement. Member 1004 is the pentagonal prism, 1005 the eye piece lens, 51 the light sensing element for the mean light measurement (or the means light measurement with weight on the central part) consisting of for example silicone photocell with superior light response property.

In the automatic aperture control portion AE, the second variable resistance Rv 101 is provided beside the variable resistance 230 presenting a slide to be rotated by means of the sector gear 223 at the same time with the slide of 230, so as to produce the $\Delta Av$ signal to be explained later. This $\Delta Av$ signal serves as the signal at the time of the manual light measuring. Further, the operation button 1007 in the drawing serves to apply the afore mentioned $\Delta Av$ signal (the aperture ring 200) to the zero point coinciding meter. The operation of the button ends the engagement of the AE holding lever 228 with 223d of the sector gear 223 switch to the manual light measuring mode. The operation button 1007 is provided with the click stop not shown and can be locked in the pushed down state or in the pulled out state. Further, 1008 in the lens barrel is the pin for transmitting the compensation signal due to the smallest F value, the length of the pin is different in accordance with the smallest F value of the interchangeable lens.

In operation, when the camera is controlled electrically, the desired shutter time for example 1/1000 sec. on the shutter time scale 110a of the shutter dial 110 is set at the index 261. The end 256a of the lever 256 is brought into contact with the electrical control part 250a of the cam 250. In consequence, all of the switches $S_{100}$, $S_{101}$ and $S_{102}$ are connected to the respective terminals a. At this time lever 256 pushes the pin 257a and shifts the driven lever 257 out of the range of the shutter button 107.

One end 254a of the time control lever 254 is at the electrical control part 251a of the mechanical time setting cam 251, while the other end 254b is out of the rotation range of the cam 252a on the leading shutter curtain gear 252. The spring 255c urges the one end 255b of the second rear shutter curtain holding lever 255 into contact with the release bar 258 while the other end 255a is outside of the rotation range of the pin 253a on the rear shutter curtain 253.

When the AE index of the aperture ring 200 is set at the index 201, the cam 200b withdraws the holding lever 260 from the stop wheel claw 229 against the spring 260c through the signal pin 204, while the switch $S_4$ is closed. When then the shutter button 107 is pushed down, the switch $S_0$ is closed at the first step operation.

This energizes the light measuring circuit 70. The light having passed the photographic lens reaches the light sensing element 51. The output in accordance with the brightness is delivered from the light sensing element 51 to the first input terminal of the operator 76 through the amplifier 74 and the log diode 75. The second input terminal of the operator 76 receives the shutter time setting signal from the shutter time setting circuit 77, the film sensitivity setting signal from the film sensitivity setting circuit 78 and the exposure compensation information signal from the exposure compensation information setting circuit 79. Based upon these supplied signals the operator 76 carries out the APEX operation. The output signal of the operator 76 is delivered to the meter 67 of the aperture display circuit 73 so as to display the aperture value, then charge the capacitor or 81 and be delivered to the first input terminal of the comparator 82.

When the shutter button 107 is further pushed down, the switch $S_1$ is closed. At this time, the driven lever 257 is outside of the range in which the shutter button 107 lowers and therefore does not operate. Thus, the electromagnet M, is excited by the comparator 82, so as to attract the stop wheel claw 229. The electromagnet $M_3$ is excited by the output of the Schmidt circuit 83 so as to lock the rear shutter plane gear 253. After the switch $S_1$ is closed, the magnet $M_2$ of the release unit Sm is excited, delayed by the delay circuit 86 so as to cancel the attractive power of the permanent magnet 245 in such a manner that the armature holding lever 246 is rotated counter clockwise by means of the spring 246a. The pin 246b opens the memory switch $S_3$ to keep the charge voltage of the condensor 81.

The signal start lever 249 outside of the casing is also rotated counter-clockwise and the rotation is transmitted to the prong 221a of the release lever 221 of the automatic aperture unit Ad. The release lever 221 is rotated clockwise against the spring 221f, so that in accordance with the rotation end 221b of the hook disengages from the bent end 219b of the lever 219. The rotation of the release lever 221 causes the part 221c to rotate the Ae holding lever 228 clockwise. Thus the holding plate of the sector gear 223 is disengaged and starts to rotate clockwise direction against the strenger of the spring 223c by means of the spring 202a of the aperture preset ring 202 at the side of the lens through the signal lever 231. The gears 225, 226 and the stop wheel 227 engaged with the sector gear 223 accelerate in rotation, while the slide 224 of the sector gear 223 slides over the variable resistance 230. When the value of the variable resistance 230 reaches the memory value of the memory condensor 81, the output of the comparator becomes zero and changes the current supply to the automatic exposure control magnet $M_1$ in such a manner that the stop wheel claw 229 is rotated along the counter clockwise direction by means of the spring 229a so as to stop the rotation of the stop wheel 227. This stopping position establishes the rotation position of the arm 202c of the aperture preset ring 202 engaged with the afore mentioned signal lever 231 and determines the aperture value.

Almost at the same as the disengagement of the Ae holding lever 228, the afore mentioned release lever 221 rotates the holding claw 210 along the counter-clockwise direction by means of the end 221d so as to disengage the automatic aperture energy storing lever 206. Hence the release lever 221 is rotated along the clockwise direction by means of the spring 206a. Along with the rotation of the automatic aperture energy storing lever 206, the automatic aperture lever 205 is rotated along the clockwise direction through the common lever 209 so as to rotate the pin 203 on the lens aperture driving ring clockwise. This closes the aperture blades, not shown, while the hold switch $S_2$ is closed.

The automatic aperture energy storing lever 206 rotates along the direction along which the end 206b leaves the lower end 234b of the mirror driving lever 234 so that the mirror driving lever 234 rotates along the counter-clockwise direction by means of the spring 234a. The mirror driving lever 234 and the mirror lifting lever 235 coaxial with the lever 234 rotates along the same direction as member 236a of the lifting up holding claw 236 so as to rotate the pin 237a of the lifting middle lever 237 along the counter clockwise direction. The other end 237b lifts the mirror receiving plate 238 along the shaft 238b through the pin 238a of the mirror receiving plate 238. Along with the lifting motion of the mirror, the not shown delay device operates that after the lapse of the time determined by the delay device the front shutter plane holding lever 239 is rotated along the clockwise direction by the afore mentioned mirror driving lever 234. The hook part at the other end is disengaged from the bent part of the front shutter plane release lever 240. The lever 240 rotates the front shutter plane keeping lever 241 along the direction of the arrow A by means of the spring 240a so as to let the front shutter plane of the not shown shutter mechanism start. The delay time produced with the delay device serves to start the shutter after a lapse of a time during which the aperture value change from the smallest value to the largest value.

Along with the start of the front shutter plane the start switch $S_5$ is opened in a conventional way and after a lapse of the time determined by means of the variable resistance $R_5$ presenting a resistance value corresponding to the set shutter time and the condensor 84 the Schmidt circuit 83 is opened so as to demagnetize the magnet $M_3$. This disengages the rear shutter plane gear 253 by means of the attracting lever 262. The rear shutter plane gear 253 starts to run so as to allow the rear shutter plane to start to run through the rear shutter plane pinion. When the rear shutter plane has run, the shutter termination signal rotates the signal lever 243 along the direction of the arrow B. Thus, the rear shutter plane signal lever 242 is rotated along the counter-clockwise direction, the mirror return signal lever 244 is rotated along the clockwise direction and 236b of the mirror lifting up holding claw 236 is rotated along the counter-clockwise direction by means of the pin 244a. This disengages member 236a from the end 235a of the mirror lifting up lever 235 to release the mirror receiving plate 238 in such a manner that a spring not shown drives the mirror to the lower position. Further the lower end of the mirror return signal lever 244 rotates the automatic aperture return signal lever 211 counter clockwise. The pin 209a of the common lever 209 is rotated along the counter-clockwise direction so as to disengage the bent down part 205b of the automatic aperture lever 205. The automatic aperture lever 205 is rotated along the counter-clockwise direction by means of the return spring 205a while by means of the not shown spring the pin 203 of the aperture driving ring at the side of the lens follows the rotation of the automatic aperture lever 205 whereby the aperture blades are opened so as to terminated the photographing.

The winding and the charge operation (shutter cocking operation) after a picture is taken involves rotating winding up shaft 214 and the charge cam 215 along the direction of the arrow C with the not shown winding lever. The intermediary lever 218 is rotated along the clockwise direction through the charge transmission lever 216. Thus the charge lever 213 is rotated along the clockwise direction so as to hold the automatic aperture lever 206 at the holding claw 210 while the pronged lever 219 is rotated along the clockwise direction so as to be held at the release lever 221. The automatic aperture energy storing lever 206 holds the mirror driving lever 234 is held in the charged state. Along with the rotation of the mirror driving lever 234 the holding claw 236 is held at the mirror lifting up lever 235. In functional engagement with the winding mechanism not shown, the front shutter release lever 240 is rotated by means of the set lever 240b so as to be held by means of the front shutter holding lever 239. At the same time with the charge of the automatic aperture unit and the mirror lift unit, the charge lever 213 rotates the gear 222 clockwise so as to hold the sector gear 223 at the Ae holding lever 228. In functional engagement with the rotation of the sector gear 223, the signal lever 231 is moved upwards (along the clockwise direction) so as to move the arm 202c of the aperture preset ring 202 on the lens against the spring 202a into the preset start position (fully opened position) of the aperture preset ring 202. The magnetic charge member 218b of the intermediary lever 218 pushes the pin 249a of the start signal lever 249. This moves the armature holding lever 246 along the same direction against the force of the spring 246 in such a manner that the magnet $M_2$ is attracted by the armature 247.

For manual operation and control all other electrical circuits for driving the mechanism other than the light measuring circuit are switched into the mechanical control. The desired shutter time value, for example 1/500 sec. on the mechanical shutter time scale 110B of the shutter dial 110 is set at the index 261, the end 256a of the selector lever 256 is brought in contact with the mechanical control part 250b of the change over cam 250. In consequence, the switches $S_{100}$, $S_{101}$ and $S_{102}$ are changed over from the terminal a to the terminal b to cut off the current supply to the AE light measuring circuit 70, the aperture control circuit 71 and the shutter control circuit 72 in the electrical circuits shown in FIG. 2. Manually setting the time at the shutter dial, causes the spring 259b to move the pin 257a of the driven lever 257 and follow the electrical-mechanical change over lever 256. The end 257c is now positioned in the path of descent of the shutter button 107. Also the end 254a of the time control lever 254 is brought into contact with the cam part 251c (corresponding to 1/500 sec.) of the mechanical shutter time setting cam. The other end 254b of the time control lever 254 remains in the rotation range of the cam 252a.

When the shutter button 107 is now pushed down, the switch $S_0$ is closed with the first step motion. Thus a constant low voltage is supplied to the manual light measuring circuit 70 from the power source E through the terminal b of the switch $S_{100}$ and the constant voltage circuit Es so as to obtain the output corresponding to the light amount incident on the light sensing element 1003 through the optical system shown in FIG. 1 in such a manner that the meter 67 displays the proper aperture value. The variable resistances $VR_1$, $VR_2$ and $VR_3$ in the manual light measuring circuit respectively serve to set the film sensitivity, the shutter time and the exposure compensation. By operating respective information setting mechanism the meter 67 is made to display the proper aperture value on the scale. In order to set the proper aperture value displayed in this way, the AE index of the aperture ring 200 is released while the aperture value, for example F5.6 is set at the index 201, when the cam part 200b leaves the change over signal pin 204 while the holding lever 260 follows the change over signal pin 204 by means of the spring 260c in such a manner that the pin 260a is positioned at the holding position of the stop wheel claw 229. When the shutter button 107 now lowers, the driven lever 257 and the release bar 258 lower together and the disengage lever 259 is rotated along the counter-clockwise direction against the strength of the spring 259a in such a manner that the bent end 259c moves upwards. The tapered part of the bent end 259c pushes the prong 221c of the release lever 221 so as to rotate the release lever 221 along the clockwise direction against the strength of the spring 221f. The AE holding lever 228 is now disengaged from the holding plate 223d as mentioned above.

Although at this time the automatic exposure control magnet $M_1$ does not attract the armature 220, the aforementioned holding lever 260 holds the stop wheel claw 229 by means of the pin 260a so that the claw part 229b of the stop wheel claw 229 does not enter the stop wheel 227. In consequence, the sector gear 223, the signal lever 231 and the aperture preset ring 202 operates in the same way as in case of the above mentioned case. The projection 202b of the aperture preset ring 202 is brought into contact with the projection 200a of the aperture ring 200 so as to stop the operation. Namely the aperture ring 200 is set at the manual value (for example F5.6), so that the aperture is preset at the value by the aperture preset ring 202. Further, when the bent part 259c of the disengage lever 259 rotates the release lever 221 clockwise against the force of the spring 221f, the hook part 221b is disengaged from the one end 219b of the lever 219. The end 221d rotates the holding claw 210 is rotated along the counter clockwise so as to disengage the automatic aperture energy storing lever 206. The automatic aperture lever 205 now operates so as to close the aperture blade and also to operate the mirror mechanism. When the mirror mechanism operates and the mirror is lifted up, the front shutter plane holding lever 239 is disengaged from the front shutter plane release lever 240. Rotation of the front shutter plane release lever 240 along the clockwise direction by means of the spring rotates 240a the front shutter plane keeping lever 241 against the strength of the spring 241a in such a manner that the pin 252b is disengaged so as to allow the front shutter plane gear 252 to rotate along the counter-clockwise direction. Hence, the not shown front shutter plane starts and the exposure starts. At this time the rear shutter plane gear 253 is not held by means of the first rear shutter plane holding lever 262 because the rear shutter plane control magnet $M_3$ is not excited. However, the release bar 258 is lowered, the end 255b of the second shutter plane holding lever 255 enters into the groove 258a by means of the spring 255c. Thus, the holding part 255a at the other end of the second rear shutter plane holding lever 255 is brought into the rotation range of the pin 253a on the rear shutter plane gear 253 so as to hold the rear shutter gear 253 (In the wound up state before the shutter button 7 is lowered, the rear shutter plane 253 remained held because the charge pin 253b is in contact with the pin 252b on the front shutter plane gear 252). When the front shutter plane 252 rotates and the cam part corresponding to the mechanical control set time on the shutter dial of the cam 252a is brought into contact with the end 254b of the time control lever 254, the shaft 254c moves along the direction along which the shaft 254c leaves the rear shutter plane gear 253 while the other end 254a remains in contact with the mechanical time control cam 251. In consequence the holding part 255a of the second holding lever 255 leaves the pin 253a on the rear shutter plane 253 outwards. Hence, the rear shutter plane is disengaged in such a manner that the rear shutter plane gear 253 is rotated along the counter-clockwise direction whereby the not shown rear shutter plane starts so as to terminate the exposure. The operation after the termination of the exposure is same as in the afore mentioned case.

In case of the above mentioned embodiment, even if the voltage of the power source is lowered, when the shutter dial is changed from the scale for the electrical shutter control to the scale for the mechanical shutter control the light measurement by means of the partial light measuring circuit operable with lower voltage is possible. When the shutter button is operated after the aperture ring has been set at the aperture value obtained with the partial light measurement efficient at the time of the manual photography the mechanical shutter operation becomes possible whereby the shutter as well as the aperture can be mechanically possible. This is quite advantageous.

Further, even when the voltage of the power source is not lowered, the set shutter time as well as the aperture value can be mechanically controlled by setting the shutter dial and the aperture ring at the desired set value at the manual side while the light measuring circuit is changed over to the partial light measuring circuit so as to display the aperture value by means of the light measurement effective for the photographer. A constant low voltage is now supplied to the light measuring circuit from the constant voltage source so as to obtain a correct result of the light measurement.

In the case of the above mentioned embodiment, the exposure is controlled mechanically by switching of the shutter dial, whereby the present embodiment is not always limited to the embodiment in such a manner that it is possible to mechanically control the exposure by sufficiently pushing down the shutter button. This mechanical exposure control is carried out at a constant shutter time, and will be explained with respect to FIG. 4 where members corresponding to those of FIG. 1 have like reference numerals.

Figure 4:
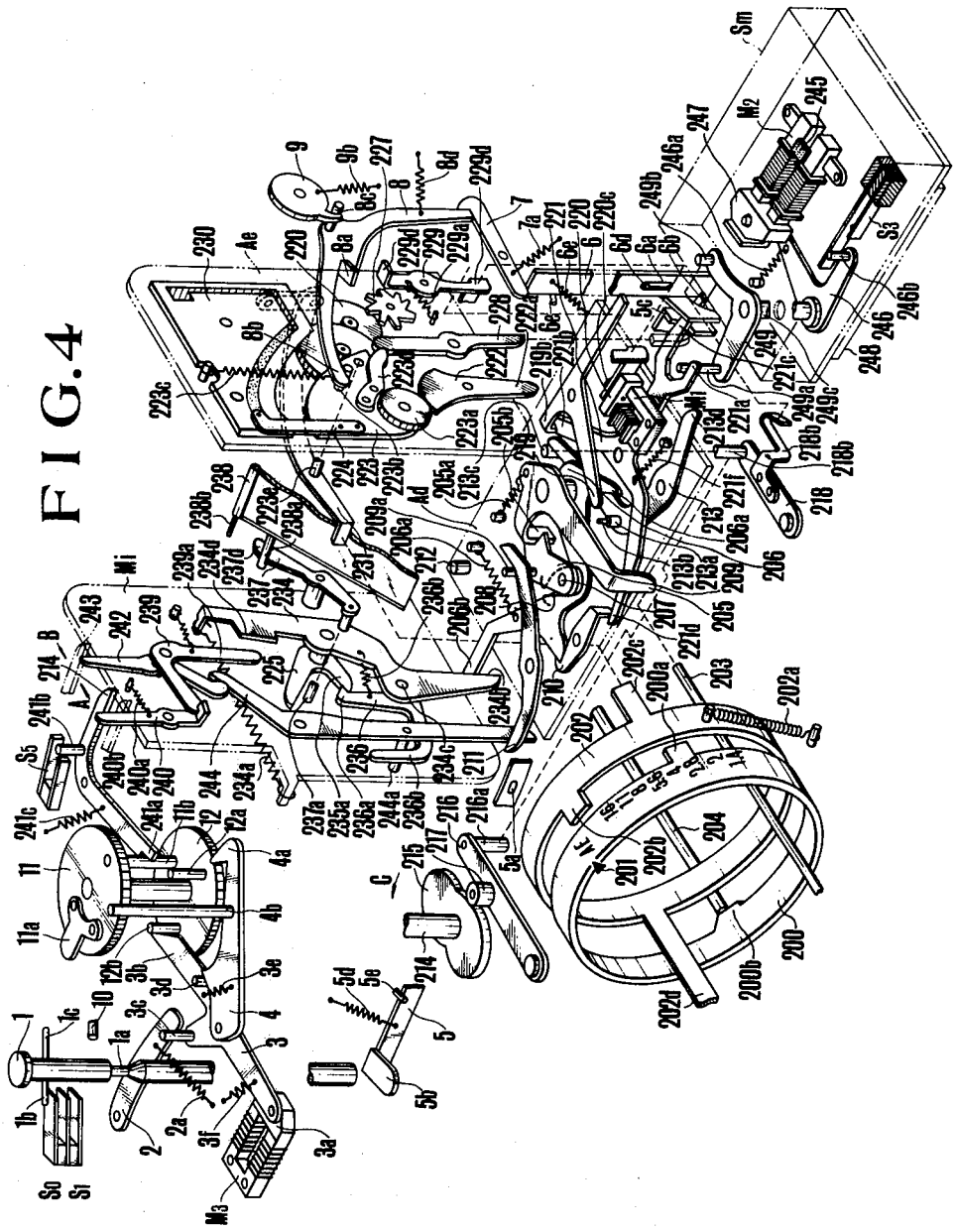
FIG. 4 shows another embodiment of the electric-mechanical change over means for the camera in FIG. 1.

In FIG. 4, member 107 is the shutter button, whose release shaft 1 presents the groove 1a in which the judge lever 2 urged along the clockwise direction by means of the spring 2a enters, being provided with the fixed switch operation pin 1b and the fixed stopper pin 1c. Further, the lower end of the release shaft 1 is able to push the bent part 5b of the mechanical release lever 5 urged along the clockwise direction by means of the spring, whereby the bent part 5b is pushed down when the shutter button 107 is further pushed down after the switch $S_1$ is closed by means of the release shaft. Member 3 is the attracting lever, whose one end presents the armature 3a and whose other end present the holding part 3b for holding the rear shutter plane. Further on the attracting lever 3, the pin 3c to be brought in contact with the afore mentioned change over lever 2 and the pin 3d to be brought in contact with the auxiliary rear shutter plane holding lever 4 are fixed. The spring 3e serves to urge the pin 3d on the attracting lever 3 to bring the lever 3 in contact with the auxiliary rear shutter plane holding lever 4. Member 3f is the spring serving to push the armature 3a provided on the attracting lever 3 against the shutter control magnet M₃, being designed to be weaker in strength than the spring 2a. The auxiliary rear shutter plane holding lever 4 rotates around the same center as the attracting lever 3, presenting a holding part 4a for holding the auxiliary rear shutter plane holding pin 12a and the fixed pin 4b at the one end. The afore mentioned mechanical release lever 5 rotates around the center 5a and has a tapered rising part 5c at the right end and facing to the prong 221c of the release lever 221 in the charged state of the camera. Hence, the rotation of the release lever 5 by means of a spring 5d is controlled by the pin 5e. Member 6 is the slide member with the long groove 6a slidable along the pin 6d, presenting a tapered part 6b facing to the one end 221c of the afore mentioned release lever 221 at a certain distance from the end 221c, whereby the lower end is normally in contact with the start signal lever 249. The slide member 6 is normally urged downwards and at the same time along the counter-clockwise direction, whereby the counter-clockwise rotation is restricted by the pin 6e. Member 7 is the holding lever normally urged along the counter-clockwise direction, whose one end is in contact with the upper end of the slide member 6 and whose other end is engaged with the auxiliary stop lever 8. The auxiliary stop lever 8 is normally urged along the counter-clockwise direction by means of the spring 8d, presenting the rising up part 8a and the charge part 8b in contact with the pin 223b so as to be charged when the camera is charged and further presenting the fixed pin 8c to be in contact with the projection 9a of the weight 9. The weight 9 serves to delay by a certain determined time when the rising up part 8a of the auxiliary stop lever 8 engages the stop wheel 227 after the holding lever 7 is disengaged from the auxiliary stop lever 8, and is normally urged into a position by means of the spring 9b. Member 10 is the stopper for controlling the push down amount of the shutter button 1, being in contact with the pin 1c. Member 11 is the conventional front shutter plane gear in functional engagement with not shown front shutter plane. Fixed on the front shutter plane gear are 11 the member 11a for contact with the pin 4b on the auxiliary rear shutter plane holding lever 4 at the time of the shutter operation and the charge pin 11b to be in contact with the auxiliary holding pin 12a on the rear shutter plane gear 12 at the time of the camera charge so as to charge the rear shutter plane in functional engagement with the charging of the front shutter plane. The rear shutter plane gear 12 is engaged with the not shown rear shutter plane in a conventional way. Fixed on the rear shutter plane gear 12 is the afore mentioned auxiliary holding pin 12a and the holding pin 12b. The holding pin 12b is engaged with the holding part 3b of the attracting lever 3 when the electrical shutter, while the auxiliary holding pin 12a is engaged with the auxiliary rear shutter plane holding lever 4 when the electrical shutter does not operate. The front shutter plane gear 11 and the rear shutter plane gear are charged making one body with each other into the position in the drawing at the time of charging, whereby the charge pin 11b is in contact with the auxiliary holding pin 12a, while both gears can operate independently from each other at the time of the shutter release.

Figure 5:
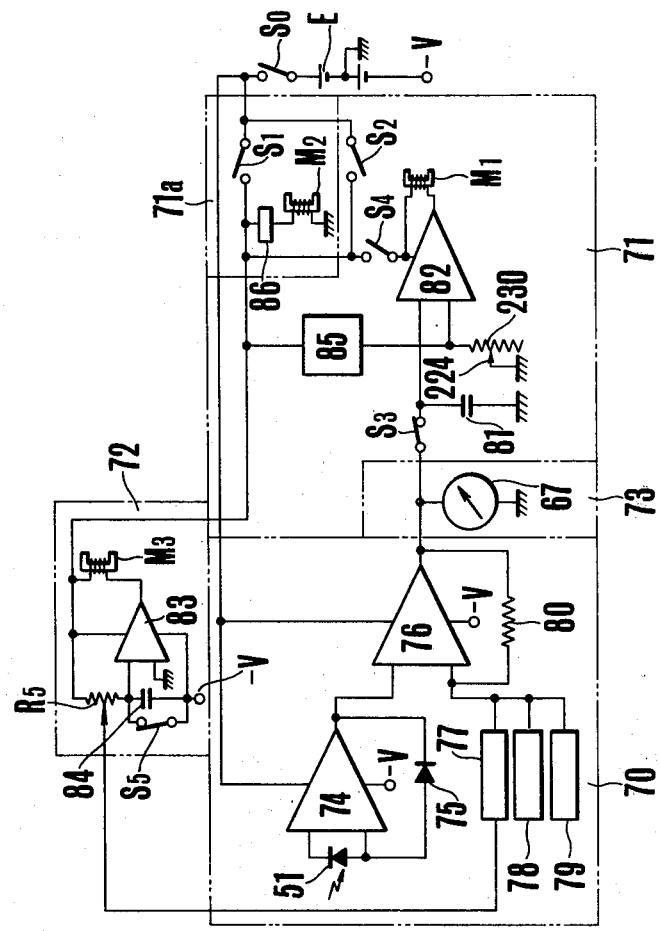
FIG. 5 shows the circuit diagram for the camera shown in FIG. 4.

FIG. 5 shows the exposure control circuit of the camera shown in FIG. 4. Here, the constant voltage circuit Es and the manual light measuring ciruit 70' in the circuit shown in FIG. 2 are eliminated.

When the voltage of the power source is above the standard level while the electrical circuit operates correctly so that the camera is controlled electrically the camera operates as follows. When the shutter button 107 is pushed, the switch $S_0$ is closed with the first step operation, so that in the same way as in case of the above mentioned embodiment the light measurement operation is carried out, and the aperture value is displayed with the meter 67. When the shutter button 107 is further pushed down, the switch $S_1$ is closed, whereby in the same way as in case of the above mentioned embodiment the release operation, the aperture control and the shutter control are carried out. At this time, the release magnet $M_2$ is demagnetized so that the armature holding lever 246 and the signal start lever 249 rotate making one body with each other along the counter-clockwise direction by means of the spring 246a. When at first the signal start lever 249 pushes the lower end of the slide member 6 so as to rotate the slide member 6 along the clockwise direction against the strength of the spring 6c. Thus, the upper end is disengaged from the holding lever 7 and goes out of the rotation range of the end 219c of the three folked lever 219. At the same time, as explained above, the release lever 221 rotates along the clockwise direction so as to disengage the afore mentioned members, while the folked part 221c is in contact with the tapered rising up part of the slide member 6. However, in the charged state only a small distance is kept between the folked part 221c and the tapered rising up part 6b so that after lapse of a very short time after the release lever 221 has started to rotate along the clockwise direction, namely the signal start lever 249 starts to rotate, the prong part 221c and the tapered rising up part 6b are in contact with each other whereby the slide member 6 is moved sliding against the strength of the spring 6c upwards. At this time as mentioned above, the slide member 6 has been rotated along the clockwise direction in such a manner that the upper end of 6 is disengaged from the holding lever 7 so that even when the slide member 6 is moved sliding upwards, the holding lever 7 remains engaged with the auxiliary stop lever 8 so that the auxiliary stop lever 8 does not operate. In consequence as mentioned above, the aperture value is electrically decided, the automatic aperture operates and the mirror is lifted up. When the mirror is lifted up, by the release lever 240 the front shutter plane keeping lever 241 is rotated along the direction of the arrow A against the strength of the weaker spring 241c. Hence, the pin 241b the start switch $S_5$ and at the same time the holding part 241a is disengaged from the charge pin 11b on the front shutter plane gear 11 so as to allow the front shutter plane to start. At this time as mentioned above the magnet $M_3$ for the shutter control has been magnetized so as to attract the armature 3a, whereby the holding part 3b of the attracting lever 3 is engaged with the holding pin 12b on the rear shutter plane gear 12 so as to prevent the rear shutter plane from starting. After a lapse of the time, set at the not shown shutter dial after the start of the front shutter plane, the magnet $M_3$ for the shutter control is demagnetized so as to disengage the armature 3a. Hence the holding pin 12b on the rear shutter plane gear 12 pushes the holding part 3b of the attracting lever 3 against the strength of the spring 3f under the effect of the not shown shutter driving spring so as to rotate the rear shutter plane gear 12 for starting the rear shutter plane. The operation after the termination of the shutter operation is the same as mentioned above.

In this way the camera is controlled electrically. When the shutter button 1 is pushed down from the position at which the switches $S_0$ and $S_1$ are closed to the position at which the pin 1c is in contact with the stopper and when the switch $S_1$ is closed, the starting magnet $M_2$ operates. The release lever 221 is immediately rotated along the clockwise direction. In consequence, even if the shutter button is pushed further down, the lower end is in contact with the rising up part 5b of the mechanical release lever 5 and the mechanical release lever 5 is rotated along the counter-clockwise direction against the spring 5d, the tapered rising up part 5c at the other end does not work upon the folked part 221c of the release lever 221. When the shutter button 1 is pushed down to the position at which the lower end of the shutter button 1 is in contact with the rising up part 5b of the mechanical release lever 5, the tapered groove 1a corresponds to the position of the judge lever 2, whereby in case the camera is electrically controlled, the magnet $M_3$ for the shutter control has already been excited, already attracting the armature 3a so that the judge lever 2 is prevented by the pin 3e from entering the tapered groove 1a.

Further, when the magnet for the shutter control is demagnetized and the holding pin 12b on the rear shutter plane gear 12 pushes the holding part of the attracting lens 3 so as to allow the rear shutter plane to start, the auxiliary rear shutter plane holding lever 4 follows the counter clockwise direction of the attracting lever 3 under the effect of the spring 3e, namely the holding lever 4 rotates along the counter clockwise direction, however, somewhat delayed. Hence the rear shutter plane gear 12 has already rotated so that when the holding part 4a already entered into the position at which the holding part 4a is in a position to hold the auxiliary holding pin 12a, the auxiliary holding pin 12a had been rotated beyond the position at which the auxiliary holding pin 12a can be held and therefore the pin 12a is not held by the holding the part 4a.

Then, the winding up and the charge operation after photographing are carried out in the same way as in case of the afore mentioned embodiment.

The camera can not be electrically controlled when the voltage of the power source is below the standard level, or when the power source is not loaded in the camera or when the electrical circuit is out of order. In this case, even if the shutter button 1 is pushed down so as to close the switches $S_0$ and $S_1$, the camera does not operate, and therefore when the shutter button 1 is further pushed down until the lower end is in contact with the rising up part 5b of the mechanical release lever 5, the mechanical release lever 5 is rotated along the counter-clockwise direction against the strength of the spring 5d, the tapered rising up part 5c at the other end is lifted up and the folked part 221c of the release lever 221 is pushed so as to rotate the release lever 221 along the counter-clockwise direction. Namely, even if the start magnet $M_2$ does not operate, the camera starts to operate mechanically in such a manner that the automatic aperture mechanism and the mirror lifting up mechanism operate in the same way as in case of the electrical control. Different from the case the camera is electrically controlled, the slide member 6 does not rotate along the clockwise direction at the time of releasing because the start signal lever 249 does not operate. In consequence, even if the lever 219 is disengaged along with the clockwise rotation of the release lever 221, the three folked lever does not rotate because the slide member is positioned in the rotation range of the end 219c of the three folked lever 219. Even if the magnet M2 for the aperture control does not operate, the stop wheel claw 229 is not engaged with the stop wheel 227, being hindered by the lever 219. When as mentioned above the release lever 221 is rotated along the clockwise direction, the automatic aperture operates and the mirror is lifted up, while at the same time the AE holding lever 228 is rotated along the clockwise direction in such a manner that the sector gear 223 starts to rotate by means of the spring 202a of the aperture preset ring 202 at the side of the lens. Further, the part 221c of the release lever 221 is brought into contact with the tapered rising up part 6a of the slide member 6 so as to move the slide member upwards, being guided in the long groove 6a. Thus, the upper end rotates the holding lever 7 along the clockwise direction against the strength of the spring 7a which is disengaged from the auxiliary stop lever 8, while the auxiliary stop lever 8 is rotated along the counter-clockwise direction by means of the spring 8d. After lapse of a certain determined time due to the load of the weight 9 whose holding part 8a is engaged with the pin 8c, the rising up part 8a is engaged with the stop wheel 227 in functional engagement with the sector gear 223 having already started to rotate, so as to stop the rotation of the sector gear 223. Then the aperture value is mechanically set at a certain determined value.

If the tapered groove 1a is positioned at the position of the judge lever 2 when the shutter button 1 is pushed down and until the pin 1c is in contact with the stopper 10, when the magnet M3 for the shutter control has been demagnetized, and does not attract the armature 3a the judge lever 2 is brought into contact with the pin 3c by means of the strong spring 2a so as to rotate the attracting lever 3 along the counter-clockwise direction into the tapered groove 1a of the shutter button 1. Thus, the auxiliary rear shutter plane holding lever 4 rotates along the counter-clockwise direction by means of the spring, following the pin 3d of the attracting lever 3, whereby the front shutter plane gear has not yet started, so that the rear shutter plane gear 12 does not operate because the auxiliary holding pin 12a is in contact with the charge pin 11b and therefore the holding part 4a enters into the holding range of the auxiliary holding pin 12a so as to engage therefore. When as mentioned, the shutter release is mechanically released, the aperture value is mechanically set at a certain determined value, the automatic aperture operates and the mirror lifts up, the front shutter keeping lever 241 is rotated along the direction of the arrow A by means of the release lever 240, the holding part 241a is disengaged from the charge pin 11b of the front shutter plane gear 11 and the front shutter plane starts to operate. During the rotation of the front shutter plane gear 11, the member 11a is brought into the pin 4b on the auxiliary rear shutter plane holding lever 4 so as to rotate the holding lever 4 along the clockwise direction. The part 4a is now disengaged from the auxiliary holding pin 12a and the rear shutter plane gear 12 starts to rotate so as to allow the rear shutter plane to operate. In this way the shutter carries out the exposure operation of a certain determined time in a mechanical way.

The above mentioned embodiment of the camera in which the start of the exposure operation is controlled by means of the magnet, is still able to operate when the voltage of the power source is below the standard level, or the power source is not loaded in the camera or the electrical circuit is out of order. The automatic mechanical exposure control is such that by pushing the same shutter button the camera operates at a given shutter speed and at a predetermined aperture. Thus, even when the camera is not controlled electrically, the exposure operation can be carried out without any additional operation so as to be able to catch every chance at a picture. Hence the camera can be utilized efficiently.

As explained above, the camera in accordance with the present invention avoids defective manual operation. It obviates the shortcoming of the conventional automatic electrical exposure control cameras. It overcomes misoperation at the time of the deterioration of the power source so that the convenience and the fidelity of the electrically controlled camera for the users are increased.

What is claimed is:

1. An exposure control device for a camera comprising;
   a first light measuring means for measuring the brightness of the object,
   a first exposure control means fo automatically controlling the exposure in accordance with the value measured by means of the first light measuring means,
   a second light measuring means for measuring the brightness of the object,
   a second exposure control means for automatically controlling the exposure by manually setting the value in accordance with the value measured by means of the second light measuring means,
   an electromagnetic actuating means for actuating the first exposure control means,
   a mechanical actuating means for actuating the second exposure control means,
   a photographic mode change over means, said means bringing the first light measuring means and the electromagnetic actuating means into operative state when the photographic mode is changed over into the automatic exposure photographic mode and bringing the second light measuring means and the mechanical actuating means into operative state when the photographic mode is changed over into the manual photographic mode.

2. An exposure control device for a camera in accordance with claim 1, wherein the second light measuring means is set operable with the lower voltage than the first light measuring means.

3. An exposure control device for a camera in accordance with claim 2, wherein the mean light measuring system is applied to the first light measuring means while the partial light measuring means is applied to the second light measuring means.

4. An exposure control device for a camera in accordance with claim 1, wherein the mode change over means is operated by means of the shutter dial.

5. An exposure control device for a camera which is shiftable between an automatic exposure control mode and a manual exposure control mode, comprising:
   first light measuring means for measuring the brightness of an object to be photographed and generating an electrical signal corresponding to the brightness of said object, exposure determining means for determining a value of the exposure automatically in response to said electrical signal generated by said first light measuring means, second light measuring means for measuring the brightness of the object to be photographed and generating an electrical signal corresponding to the brightness of the object, display means for displaying the output of the electrical signal generated by said second light measuring means, an arrangement for applying a source voltage to said first light measuring means and said exposure determining means, constant voltage generating means energizable by the source voltage and arranged to produce and apply constant voltage to said second light measuring means and said display means, and switching means shiftable between a first position at which the source voltage is applied to said first light measuring means and said exposure determining means and a second position at which the constant voltage is applied to said second light measuring means and said display means, so that a photograph may be made in an automatic exposure control mode when said switching means is shifted to the first position and in a manual exposure control mode when said switching means is shifted to the second position.

6. An exposure control device according to claim 5, wherein said constant voltage producing means produces constant voltage which is lower than the voltage of said voltage source.

7. An exposure control device for a camera, comprising:

first light measuring means for measuring the brightness of an object to be photographed and generating an electrical signal corresponding to the brightness of said object, a diaphragm device having an aperture therein, aperture setting means coupled to the diaphragm device for manually setting an aperture value, aperture adjusting means for automatically adjusting the aperture of the diaphragm device and generating an electrical signal corresponding to the adjustment made thereby, comparator means for comparing the electrical signal generated by said aperture adjusting means with that generated by said first light measuring means to provide a coincidence signal output when the difference between these electrical signals has reached a predetermined value, locking means for locking the adjusting operation of said adjusting means in response to the coincidence signal produced by said comparator means, second light measuring means for measuring the brightness of the object to be photographed and generating an electrical signal corresponding to the brightness of said object, display means for displaying the electrical signal output of said second light measuring means, a shutter opening member, a shutter closing member, shutter time control means for electrically actuating said shutter closing member a predetermined time after the actuation of said shutter opening member, actuating means for actuating said adjustment means and said shutter opening member, electromagnetic release means for operating said actuating means, a first switch for operating said electromagnetic release means, a release member for allowing said actuating member to operate, a first operating member for operating said switch and said release member, a movable member shiftable between one position at which said first operating member is interlocked with said release member and another position at which said first operating member is not interlocked with said release member, a second switch for controlling supply of electric power, said switch being shiftable between a first position where the first light measuring means, the adjusting means, the comparator means and the shutter time control means are supplied with electric power and a second position where the second light measuring means and the display means are supplied with electric power, a switching member for selecting one of an automatic exposure control mode in which the second switch is shifted to said first position and said movable member is shifted to the non-interlocked position, and a manual exposure control mode in which the second switch is shifted to said second position and said movable member is shifted to the interlocked position, a control member arranged to be operative depending on the shifting of said switching member to the manual exposure mode, said control member serving to actuate the shutter closing member a predetermined time after the actuation of the shutter opening member, and a second operative member for shifting said switching member.

8. An exposure control device according to claim 7, in which said first operating member is a release button.

9. An exposure control device according to claim 8, in which said second operating member is a shutter dial.

10. An exposure control device for a camera, comprising:

first light measuring means for measuring the brightness of an object to be photographed and generating an electrical signal corresponding to the brightness of said object, a first exposing device, first automatic exposure determining means for automatically determining the exposure of said first exposing device in response to the electrical signal generated by said first light measuring means, first manual exposure setting means for manually determining the exposure of said first exposing device, a second exposing device, second automatic exposure determining means for electrically determining the exposure of said second exposing device, second manual exposure setting means for mechanically determining the exposure of said second exposing device actuating means for actuating said first and second exposing devices, electromagnetic release means for causing said actuating means to operate, a first switch for causing said electromagnetic release means to operate, a release member to cause said actuating means to operate, an operating member for operating said switch and said release member, movable means movable between one position where said operating member and said release member are interlocked with each other and another position where they are not interlocked with each other, second light measuring means for measuring the brightness of the object to be photographed and generating an electrical signal corresponding to the brightness of said object, display means for displaying the electrical signal output of said second light measuring means, a second switch for controlling supply of electric power, said switch being shiftable between a first position where the first light measuring means, the first automatic exposure determining means, the second exposure determining means and the electromagnetic release means are supplied with electric power and a second position where the second light measuring means and the display means are supplied with electric power, and switching means for selecting an automatic exposure control mode where the second switch is shifted to said first position and said movable member is shifted to the non-interlocked position or a manual exposure control mode where the second switch is shifted to said second position and said movable member is shifted to the interlocked position.

11. An exposure control device according to claim 10, wherein said first light measuring means responds to an energizing voltage and further comprising constant voltage generating means arranged between said switch in its second position and said second light measuring means and display means for generating a lower voltage, so that the lower voltage is applied to said second light measuring means and said display means when said switch is shifted to said second position.

12. A device as in claim 11, wherein the first light measuring means includes a mean light measuring system and said second light measuring means includes a spot measuring system.

* * * * *